(12) United States Patent
Nagasawa

(10) Patent No.: US 12,043,192 B2
(45) Date of Patent: Jul. 23, 2024

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 328 days.

(21) Appl. No.: 17/690,221

(22) Filed: Mar. 9, 2022

(65) Prior Publication Data

US 2022/0306023 A1 Sep. 29, 2022

(30) Foreign Application Priority Data

Mar. 29, 2021 (JP) .................................. 2021-054742

(51) Int. Cl.
| | |
|---|---|
| *B60R 19/20* | (2006.01) |
| *B60R 21/0134* | (2006.01) |
| *B60R 21/2338* | (2011.01) |

(52) U.S. Cl.
CPC ........ *B60R 19/205* (2013.01); *B60R 21/0134* (2013.01); *B60R 21/2338* (2013.01)

(58) Field of Classification Search
None
See application file for complete search history.

(56) References Cited

U.S. PATENT DOCUMENTS

| | | | | |
|---|---|---|---|---|
| 6,106,038 | A | * | 8/2000 | Dreher ...................... B60T 7/22 293/118 |
| 10,953,844 | B2 | * | 3/2021 | Farooq .................... B60R 21/36 |
| 2001/0028173 | A1 | | 10/2001 | Demarquilly et al. |

FOREIGN PATENT DOCUMENTS

| | | |
|---|---|---|
| JP | 2001-301550 A | 10/2001 |
| JP | 2008-044594 A | 2/2008 |
| JP | 201678762 * | 5/2016 |

* cited by examiner

*Primary Examiner* — Joseph D. Pape
(74) *Attorney, Agent, or Firm* — MCGINN I.P. LAW GROUP, PLLC

(57) ABSTRACT

An airbag apparatus to be applied to a vehicle includes an airbag configured to be deployed forward of a vehicle body front of the vehicle, a collision determiner configured to establish a pre-crash determination in a case where a collision probability with a human body or an object other than a human body is equal to or higher than a predetermined threshold, and an airbag deployment controller configured to deploy the airbag in response to the pre-crash determination. The airbag includes a slit portion formed by recessing a front surface rearward of the vehicle, and branches divided by the slit portion. The airbag apparatus further includes a coupling member configured to couple the branches to each other, and a coupling member disabling unit configured to break coupling of the branches by the coupling member in a case where a collision with the human body is predicted.

5 Claims, 4 Drawing Sheets

AIRBAG APPARATUS

CROSS-REFERENCE TO RELATED APPLICATIONS

The present application claims priority from Japanese Patent Application No. 2021-054742 filed on Mar. 29, 2021, the entire contents of which are hereby incorporated by reference.

BACKGROUND

The disclosure relates to an airbag apparatus including an airbag deployable outward from a vehicle body front of a vehicle such as an automobile.

Concerning a vehicle such as an automobile, it has been proposed to use an airbag deployable out of the vehicle so as to prevent damage to a vehicle body, for example, during a collision.

As a technique regarding such an external airbag apparatus, Japanese Unexamined Patent Application Publication (JP-A) No. 2001-301550, for example, discloses that an expandable element (airbag) is deployed forward of a vehicle body of a railroad vehicle, and that a surface in contact with a region of the vehicle that is to be protected and a surface that receives an impact are coupled with a plurality of flexible coupling elements.

As a technique regarding control of a shape and other properties of an airbag during deployment, JP-A No. 2008-044594, for example, discloses an airbag disposed inside a vehicle cabin of a vehicle so as to protect an occupant during a collision. The airbag includes a plurality of tethers to restrict a separation distance from a storage portion to an occupant protecting portion of the airbag when expanded completely, and engagement members to engage the tethers with the storage portion. The engagement members release engagement with the tethers selectively to incline the occupant protecting portion.

SUMMARY

An aspect of the disclosure provides an airbag apparatus to be applied to a vehicle. The airbag apparatus includes an airbag, a collision determiner, and an airbag deployment controller. The airbag is configured to be deployed forward of a vehicle body front of the vehicle. The collision determiner is configured to establish a pre-crash determination in a case a collision probability with a human body or an object other than a human body is equal to or higher than a predetermined threshold. The airbag deployment controller is configured to deploy the airbag in response to the pre-crash determination. The airbag includes a slit portion and branches. The slit portion is formed by recessing a front surface rearward of the vehicle. The branches are divided by the slit portion. The airbag apparatus further includes a coupling member and a coupling member disabling unit. The coupling member is configured to couple the branches to each other. The coupling member disabling unit is configured to break coupling of the branches by the coupling member in a case where a collision with the human body is predicted.

An aspect of the disclosure provides an airbag apparatus to be applied to a vehicle. The airbag apparatus includes an airbag and circuitry. The airbag is configured to be deployed forward of a vehicle body front of the vehicle. The circuitry is configured to establish a pre-crash determination in a case a collision probability with a human body or an object other than a human body is equal to or higher than a predetermined threshold. The circuitry is configured to deploy the airbag in response to the pre-crash determination. The airbag includes a slit portion and branches. The slit portion is formed by recessing a front surface rearward of the vehicle. The branches are divided by the slit portion. The airbag apparatus further includes a coupling member and a coupling member disabling unit. The coupling member is configured to couple the branches to each other. The coupling member disabling unit is configured to break coupling of the branches by the coupling member in a case where a collision with the human body is predicted.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Concerning a collision of a vehicle with a pedestrian or a bicyclist (hereinafter referred to as a "pedestrian or the like"), there has been a demand for preventing injury to the pedestrian or the like.

In general, a vehicle such as an automobile is designed considering absorption of collision energy by collapsing a front structure of a vehicle body upon a frontal collision.

In many cases, such energy absorption is on the assumption that another vehicle that has collided with the host vehicle has substantially the same vehicle weight as the host vehicle, and that the collision occurs at a relative speed of several tens of km per hour, for example.

Actually, however, there is a possibility of occurrence of a collision with a vehicle larger than the host vehicle, a collision with a vehicle at a higher speed than a presumed vehicle speed, and a multiple collision with a plurality of vehicles in succession, for example. Presumably, there are also cases where sufficient energy absorption is not performed by collapsing the vehicle body structure.

Consequently, there has been a demand for mitigating damage during a collision without excessively depending on the vehicle body structure.

It is desirable to provide an airbag apparatus that makes it possible to prevent injury to a pedestrian or the like and to mitigate damage to a vehicle during a collision with an object.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is disposed, for example, on a front of a vehicle body of an automobile such as a passenger vehicle so as to protect (reduce injuriousness to) a human body of a pedestrian, a bicyclist or the like with whom the automobile has collided, and also to mitigate damage to the vehicle body of the host vehicle, for example, during a collision with an object such as another vehicle.

Figure 1:
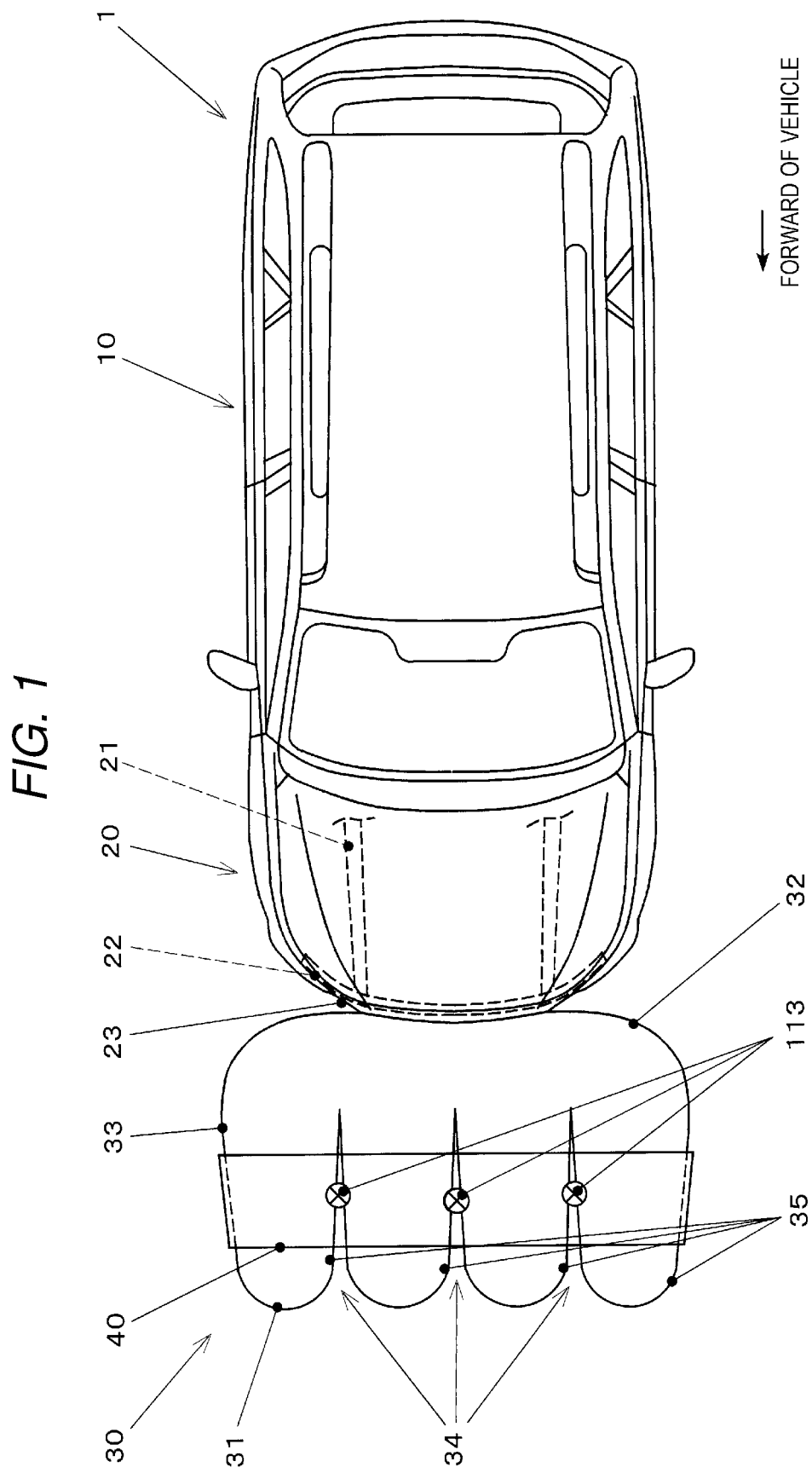
FIG. 1 is a diagram schematically illustrating a configuration of an airbag apparatus according to an embodiment of the disclosure.

FIG. 1 is a diagram schematically illustrating a configuration of the airbag apparatus according to the embodiment.

FIG. 1 illustrates a state of a vehicle including the airbag apparatus according to the embodiment, as viewed from above.

The vehicle 1 has, for example, a so-called two-box vehicle shape including an engine compartment 20 that protrudes forward from a vehicle cabin 10.

The vehicle cabin 10 has a space containing an occupant, for example.

The engine compartment 20 has a space containing power train components such as an engine, a transmission, a motor-generator in the case of an electric vehicle, and control units for these components.

The engine compartment 20 includes front side frames 21, a bumper beam 22, a front bumper 23, and other components.

The front side frames 21 are structural members protruding toward the front of the vehicle from a toeboard, not illustrated, which is a partition wall disposed on a front end of the vehicle cabin 10.

The front side frames 21 serve, for example, as cross members where a power train and a front suspension are attached, and as a base portion where a component such as a strut housing containing struts of a MacPherson-strut front suspension is attached.

For example, a steel plate is molded into components by presswork, and the components are gathered and welded into the front side frames 21. Thus, the front side frames 21 each have a closed rectangular cross-sectional shape as viewed from a vehicle fore-and-aft direction.

The bumper beam 22 is a structural member disposed on the vehicle body front and extending in a vehicle width direction.

For example, a steel plate is molded into components by presswork, and the components are gathered and welded into the bumper beam 22 or the bumper beam 22 is made of an extruded material of aluminum alloy. Thus, the bumper beam 22 is a beam-shape member of a closed cross-sectional shape.

An intermediate portion of the bumper beam 22 is coupled to front ends of the left and right front side frames 21.

Both ends of the bumper beam 22 in the vehicle width direction protrude outward in the vehicle width direction from the front side frames 21.

The bumper beam 22 is a load transmission member by which a load that an airbag 30, described later, receives from a human body or object collided with is transmitted to a rear side of the vehicle body via the front side frames 21.

The front bumper 23 is an exterior member disposed on a front end of the vehicle body, and includes a bumper face that is made of a material such as PP resin and that constitutes a skin. The bumper face is attached to the vehicle body with brackets, not illustrated, for example.

A front surface of the front bumper 23 is curved in such a manner that the vehicle front is convex when the vehicle 1 is viewed from above.

The bumper beam 22 has such an arcuate shape that the vehicle front is convex along a curve of the front surface of the front bumper 23 when the vehicle 1 is viewed from above.

The airbag apparatus according to the embodiment includes the airbag 30.

The airbag 30 is formed in a bag shape by bonding panels of base cloth such as nylon 66 woven fabric.

When each pre-crash determination, described later, is established, deployment gas generated by an inflator 111 is introduced into the airbag 30, and the airbag 30 is deployed and further expanded.

The airbag 30 is deployed forward of the vehicle from a center portion of the front end of the vehicle body in the vehicle width direction.

The airbag 30 includes a front surface 31, a rear surface 32, side surfaces 33, and slit portions 34, for example.

The front surface 31 is a surface portion that constitutes a front end of the airbag 30. Upon a collision, a pedestrian, another vehicle or the like first comes into contact with the front surface 31.

The rear surface 32 is a surface portion that constitutes a rear end of the airbag 30. The rear surface 32 extends along the front surface of the front bumper 23.

The side surfaces 33 extend between left and right side ends of the front surface 31 and between left and right side ends of the rear surface 32 in the fore-and-aft direction.

An upper surface, not illustrated, extends between an upper end of the front surface 31 and an upper end of the rear surface 32. A lower surface, not illustrated, extends between a lower end of the front surface 31 and a lower end of the rear surface 32.

In normal operation (before a pre-crash determination is established), the airbag 30 in a folded state is attached to the bumper beam 22 and contained inside the front bumper 23.

Upon a collision, the airbag 30 ruptures a fragile portion of the front bumper 23 and is unfolded forward of the vehicle and deployed forward of the front surface of the front bumper 23.

The slit portions 34 are formed in a groove shape by recessing the front surface 31 rearward of the vehicle.

The slit portions 34 are distributed in the vehicle width direction. In an example illustrated in FIG. 1, the three slit portions 34 are formed.

Each of the slit portions 34 has, for example, a groove shape extending substantially vertically.

The front portion of the airbag 30 where the slit portions 34 are formed in the vehicle fore-and-aft direction is divided into a plurality of regions disposed in the vehicle width direction.

As illustrated in FIG. 1 and other drawings, the front surface 31 of the airbag 30 except for the regions where the slit portions 34 are formed has convexly curved surfaces protruding forward.

When a pedestrian or the like collides with the front surface 31, each of these convexly curved surfaces guides the pedestrian or the like to the slit portion 34 on one of the left and right sides of the convexly curved surface.

The slit portions 34 may be formed, for example, by coupling the front surface 31 and the rear surface 32 with pulling members such as internal tethers, not illustrated, and pulling the front surface 31 rearward of the vehicle.

The slit portions 34 divide the front portion of the airbag 30 into a plurality of branches 35 disposed in the vehicle width direction.

A tether 40 is disposed outside the front portion of the airbag 30 and couples the branches 35 to one another.

The tether 40 is a flexible, belt-shaped member made of, for example, a base cloth panel in a strap shape. In one embodiment, the tether 40 may serve as a "coupling member".

The tether 40 has an annular shape, for example, and is wound on an outer surface of the front portion of the airbag 30 so as to bind the plurality of branches 35.

The tether 40 is attached to the outer surface of the airbag 30 by a method such as sewing and heat-sealing.

Figure 2:
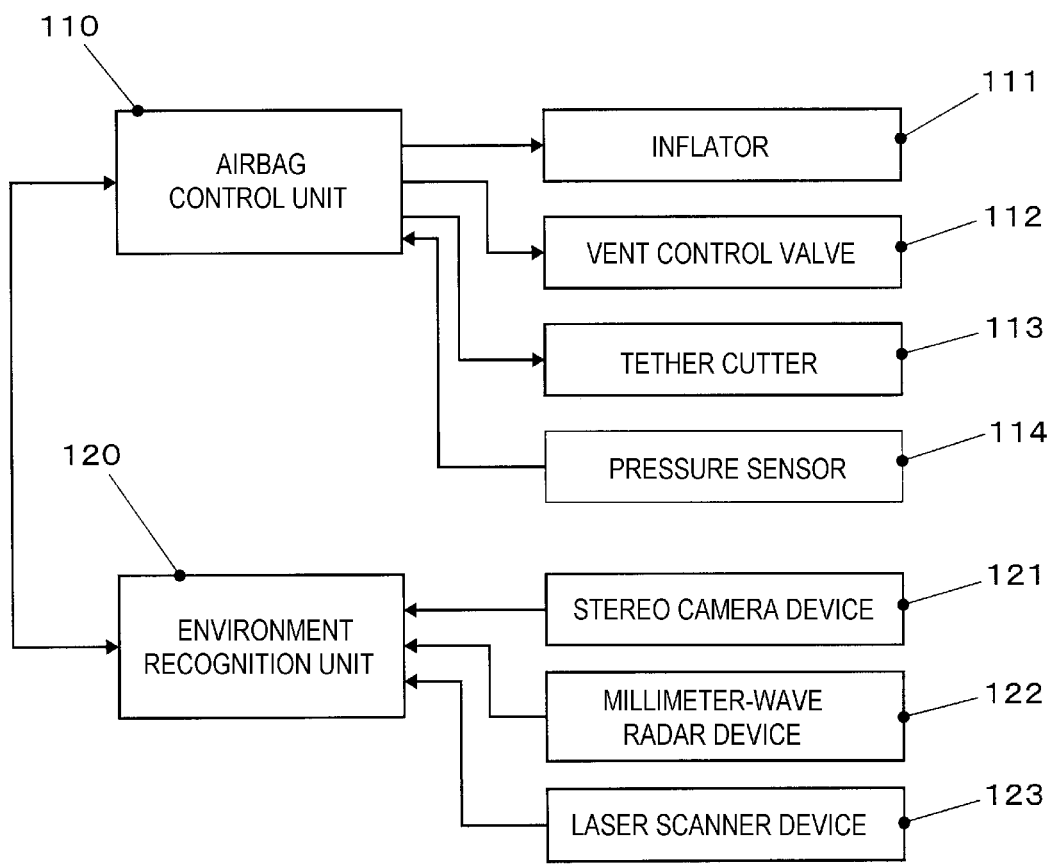
FIG. 2 is a block diagram schematically illustrating a configuration of a system to control the airbag apparatus according to the embodiment.

FIG. 2 is a block diagram schematically illustrating a configuration of a system to control the airbag apparatus according to the embodiment.

The system to control the airbag apparatus includes components such as the airbag control unit 110, and an environment recognition unit 120.

Each of these units may be provided as, for example, a microcomputer including an information processor such as a CPU, storages such as a RAM and a ROM, an input/output interface, and buses to couple these components to one another.

The units are connected via in-vehicle LAN such as a CAN communication system or directly and are mutually communicable.

The airbag control unit 110 commands and controls the inflator 111, a vent control valve 112, and the tether cutters 113 so as to deploy the airbag 30 and also to control a deployment state.

In one embodiment, the airbag control unit 110 may serve as an "airbag deployment controller".

The inflators 111 are chemical (explosive) gas generation devices to generate deployment gas to deploy the airbags in response to a command from the airbag control unit 110.

The vent control valve 112 opens and closes a vent passage, not illustrated, to discharge gas from the airbag 30 (e.g., release gas to the atmosphere).

In one example, the vent control valve 112 independently opens and closes the vent passage of the airbag 30 in response to a command from the airbag control unit 110.

The vent control valve 112 may include an electromagnetic valve, for example.

The tether cutters 113 are disposed on the tether 40 and cut the tether 40 in response to a command from the airbag control unit 110. In one embodiment, the tether cutters 113 may serve as a "coupling member disabling unit".

The tether cutters 113 may cause chemical (explosive) actuators, for example, to cut the tether 40.

As illustrated in FIG. 1, the tether cutters 113 are disposed above the respective slit portions 34 and break coupling of the branches 35 by cutting the tether 40 at positions adjacent to the slit portions 34.

The airbag control unit 110 is provided with a pressure sensor 114.

The pressure sensor 114 detects an internal pressure of the airbag 30.

Based on an output from the pressure sensor 114, the airbag control unit 110 can detect an input state of the load on the airbag 30.

The environment recognition unit 120 recognizes an environment around the host vehicle based on outputs from various sensors.

The environment recognition unit 120 recognizes, for example, human bodies of pedestrians, bicyclists, or the like, various objects such as other vehicles, buildings, trees, and geographical features, and road shapes (lane shapes) in the vicinity of the vehicle 1 (host vehicle).

When a collision with a human body of a pedestrian, a bicyclist, a motorcyclist, or the like, or with an object other than a human body, such as another vehicle, is unavoidable (when a collision probability is a predetermined value or higher), the environment recognition unit 120 establishes a pre-crash determination. In one embodiment, the environment recognition unit 120 may serve as a "collision determiner".

Components such as a stereo camera device 121, a millimeter-wave radar device 122, and a laser scanner device 123 are coupled to the environment recognition unit 120.

The stereo camera device 121 includes a pair of cameras disposed at a predetermined interval (base line length), and recognizes human bodies of pedestrians, bicyclists, or the like, and objects such as other vehicles and buildings. The stereo camera device 121 also detects a position of each of the human bodies, objects, or the like relative to the vehicle 1 using known stereo image processing.

The stereo camera device 121 recognizes attributes of a subject or object by, for example, pattern recognition of a captured image.

For example, in the case of a human body of a pedestrian or the like, the stereo camera device 121 recognizes attributes such as a build, presumed weight, and posture of the human body.

For example, in the case of an object such as another vehicle, the stereo camera device 121 recognizes a model and size of the other vehicle (e.g., whether the other vehicle is a large-size vehicle, such as a truck, bus, and large-size SUV, which has a notably larger weight than the vehicle 1).

The millimeter-wave radar device 122 uses radio waves in a frequency band of 30 to 300 GHz, for example, and detects presence of a human body, an object, or the like, and positions of the human body, the object, or the like relative to the vehicle 1.

The laser scanner device (LiDAR) 123 irradiates and scans the vehicle 1 and its vicinity with a near-infrared laser beam in a pulse shape, for example. Based on presence of reflected light and time lags until the reflected light returns, the laser scanner device 123 detects presence of a human body, an object, or the like, positions of the human body, the object, or the like relative to the vehicle 1, and shapes of the human body, the object, or the like.

When a collision with a human body of a pedestrian or the like, or an object such as another vehicle is unavoidable (when a pre-crash determination is established), for example, the environment recognition unit 120 is capable of recognizing a collision mode with the human body, the object, or the like (e.g., a speed vector of the other party of the collision with respect to the vehicle 1, and a collision position relative to the vehicle 1), and attributes of the other party of the collision (e.g., a build of the human body and a model of the other vehicle).

Next, an operation of the airbag apparatus according to the embodiment will be described.

Figure 3:
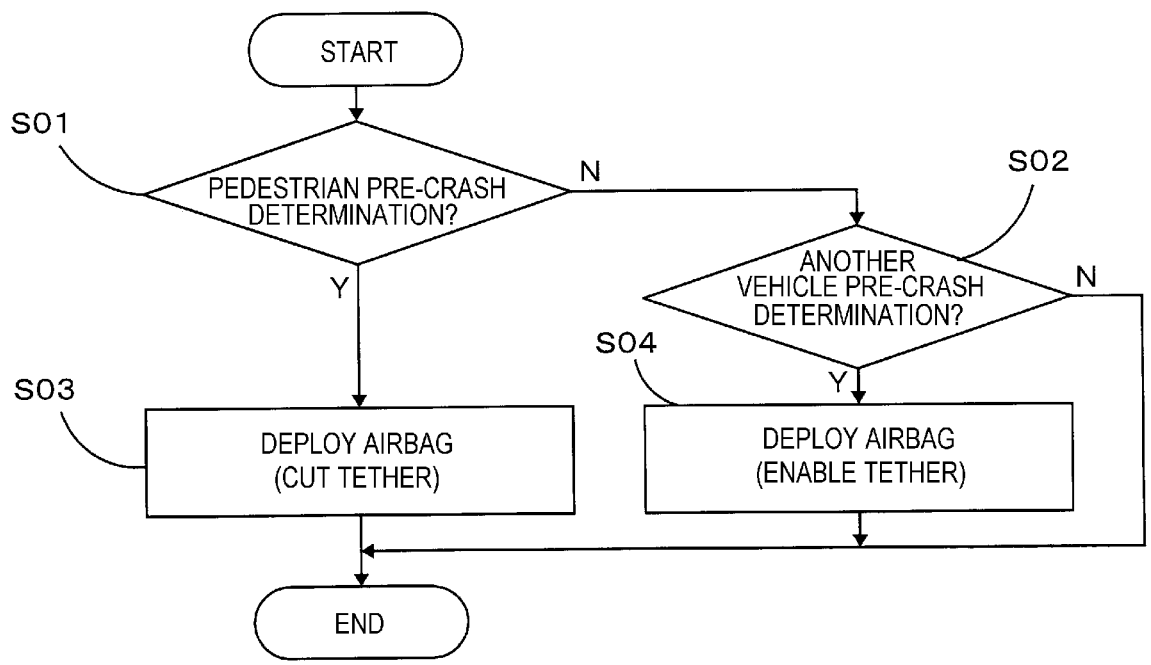
FIG. 3 is a flowchart of an operation of the airbag apparatus according to the embodiment in the event of a collision.

FIG. 3 is a flowchart of an operation of the airbag apparatus according to the embodiment in the event of a collision.

The operation will now be described step by step.

Step S01: Pedestrian Pre-Crash Determination

Using known pre-crash determination logic, the environment recognition unit 120 estimates a probability of occurrence of a collision with a human body of a pedestrian, a bicyclist, or the like approaching from ahead of the vehicle 1, and determines whether the estimated probability is equal to or higher than a preset threshold.

When the probability of occurrence of the collision is equal to or higher than the threshold, the environment recognition unit 120 regards the collision as unavoidable, establishes a human-body pre-crash determination, and the process proceeds to step S03. Otherwise, the process proceeds to step S02.

Step S02: Another Vehicle Pre-Crash Determination

Using known pre-crash determination logic, the environment recognition unit 120 estimates a probability of occurrence of a collision with an object other than a human body, such as another vehicle approaching from ahead of the vehicle 1 and a building, and determines whether the estimated probability is equal to or higher than a preset threshold.

When the probability of occurrence of the collision is equal to or higher than the threshold, the environment recognition unit 120 regards the collision as unavoidable, establishes an object pre-crash determination, and the process proceeds to step S04. Otherwise, the process ends (returns).

Step S03: Airbag Deployment (Tether Cut)

The airbag control unit 110 gives the inflator 111 a command to generate deployment gas so as to deploy the airbag 30.

At this time, the airbag control unit 110 operates the tether cutters 113 to cut the tether 40 and break coupling of the branches 35.

Thus, the plurality of slit portions 34 divide the front portion of the airbag 30 into the plurality of branches 35, and also, coupling of the branches 35 is broken to enable relative displacement of the branches 35.

Until the deployment of the airbag 30 is completed, for example, the vent control valve 112 may be in a closed state to quicken the deployment, and the vent control valve 112 may be switched to an opened state after the deployment ends.

Thus, an internal pressure of the airbag 30, a volume of which is restricted by the tether 40, can be prevented from excessively increasing, and the airbag 30 can be contracted while air is being discharged from the airbag 30 in accordance with a progress of the collision with the pedestrian or the like so as to absorb energy.

Thereafter, the pedestrian or the like is pressed forward and accelerated by the airbag 30, and after a relative speed of the pedestrian or the like and the vehicle body is decreased to a predetermined threshold or lower, the vent control valve 112 is switched to a closed state so that the internal pressure of the airbag 30 can be increased to reinforce restraint of the pedestrian or the like. This threshold for the relative speed is set considering, for example, prevention of the pedestrian or the like from being seriously damaged during the collision with the vehicle body.

Then, the process ends.

Step S04: Airbag Deployment (Tether Enabled)

The airbag control unit 110 gives the inflator 111 a command to generate deployment gas so as to deploy the airbag 30.

At this time, the airbag control unit 110 does not operate the tether cutters 113 but keeps the tether 40 in an enabled state. Thus, the branches 35 are maintained in a mutually bound and coupled state.

Until the deployment of the airbag 30 is completed, for example, the vent control valve 112 may be in a closed state to quicken the deployment, and the vent control valve 112 may be switched to an opened state after the deployment ends.

Thus, the airbag 30 can be contracted while air is being discharged from the airbag 30 in accordance with a progress of the collision with the other vehicle or the like so as to absorb energy.

Then, the process ends.

Figure 4:
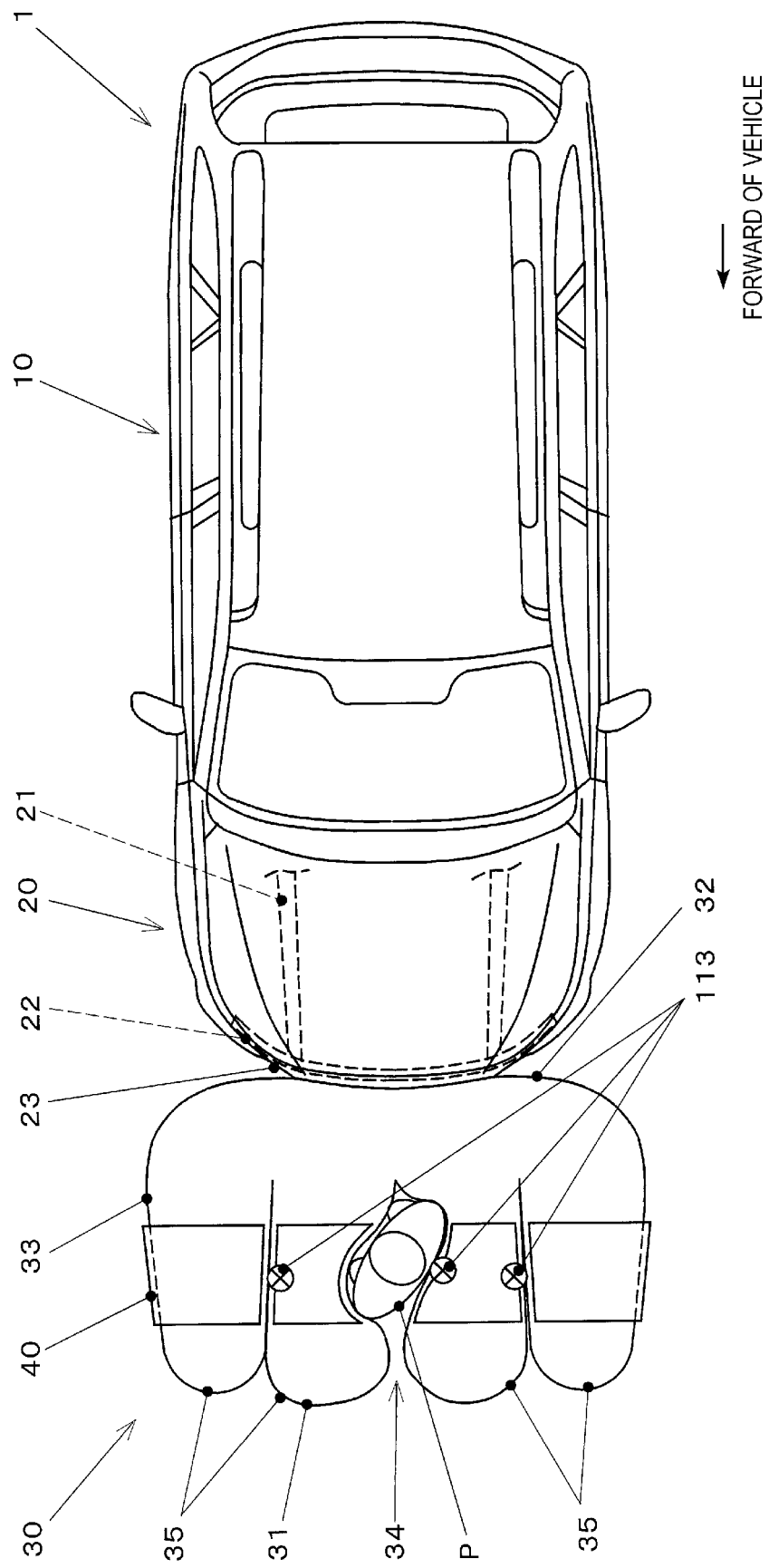
FIG. 4 is a diagram schematically illustrating a state after a vehicle including the airbag apparatus according to the embodiment has collided with a pedestrian.

FIG. 4 is a diagram schematically illustrating a state after a vehicle including the airbag apparatus according to the embodiment has collided with a pedestrian.

When a pre-crash determination is established and when a collision with a pedestrian P is predicted, the airbag 30 is deployed with the tether 40 in a disabled (cut) state.

In this state, the branches 35 of the front portion of the airbag 30 are allowed to individually swing.

In an example illustrated in FIG. 4, the pedestrian P enters a central one of the slit portions 34 in the vehicle width direction and is restrained by the branches 35 on both sides of the central slit portion 34.

In this state, the airbag 30 is contracted while gas is discharged from the vent passage so as to absorb collision energy, and also, the airbag 30 presses and accelerates the pedestrian P forward of the vehicle so as to decrease the relative speed of the vehicle body and the pedestrian P.

When the relative speed becomes equal to or less than a predetermined threshold, the airbag control unit 110 switches the vent control valve 112 to a closed state to increase the internal pressure of the airbag 30.

Thus, retention force to hold the pedestrian P inside the slit portion 34 is increased to prevent secondary injury such as the pedestrian P being thrown forward of the airbag 30 in accordance with deceleration of the vehicle 1.

In another example, when another vehicle collides with the front side of the vehicle 1, the airbag 30 is deployed with the tether 40 in an enabled (uncut) state, as illustrated in FIG. 1.

In this case, because the branches 35 of the front portion of the airbag 30 are bound together, shape stability upon the collision with the other vehicle can be enhanced to stably sustain collision energy input by the other vehicle.

As has been described heretofore, this embodiment can produce the following effects.

1. During a collision with a human body of the pedestrian P or the like, the tether 40 is disabled to allow the slit portions 34 to separate the branches 35 of the front portion of the airbag 30 from one another. Consequently, the pedestrian P or the like collided with enters one of the slit portions 34 and is held between the branches 35 on both sides of the slit portion 34 so that impact energy can be absorbed by deformation and contraction, for example, of the airbag 30 while the pedestrian P or the like is stably restrained, and that the pedestrian P or the like can be pressed and accelerated forward of the vehicle so as to decrease relative acceleration of the pedestrian P or the like and the vehicle body, thereby preventing injury.

Since the pedestrian P or the like is retained while held in the slit portion 34, risk of secondary injury such as the pedestrian P or the like being sent flying forward of the vehicle can be reduced.

During a collision with an object such as another vehicle, the branches 35 of the front portion of the airbag 30 are mutually coupled by the tether 40 so that shape stability of the airbag 30 can be enhanced to stably receive collision energy input by the object such as the other vehicle.

2. The branches 35 of the airbag 30 that are divided by the slit portions 34 are coupled by the tether 40, and the tether 40 is cut and disabled by the tether cutters 113 so that the above-described effects can be effectively obtained with a simple configuration.

3. The slit portions 34 each extend vertically, and the plurality of slit portions 34 are formed in the front surface 31 of the airbag 30 while distributed in the vehicle width direction so that the pedestrian P or the like that has collided over a wide range in the vehicle width direction can be restrained.

Modifications

The disclosure is not to be limited to the above-described embodiment but may be modified in various manners. Such modifications will also fall within the technical scope of the disclosure.

1. The configurations of the airbag apparatus and the vehicle are not to be limited to those of the above-described embodiment but may be modified as suited.

For example, a configuration, shape, material, manufacturing method, location, and the number of each kind of components that constitute the airbag apparatus and the vehicle, and details of various kinds of control are not to be limited to those of the embodiment but may be modified as suited.

2. A method of performing a pre-crash determination and a method of discriminating a collision mode are not to be limited to those in the above-described embodiment but may be modified as suited.

3. In the embodiment, the front portion of the airbag is divided into the plurality of branches in the vehicle width direction by forming the plurality of slit portions extending vertically and distributed in the vehicle width direction. However, an extending direction and an arrangement of the slit portions are not to be limited to these but may be changed as suited.

For example, the front portion of the airbag may be divided into upper and lower branches by a slit portion extending in the vehicle width direction. A plurality of such slit portions extending in the vehicle width direction may be formed or combined with the slit portions extending vertically as in the embodiment. Moreover, the slit portions may be inclined with respect to the vertical direction and the vehicle width direction.

4. In the embodiment, the tether is used as the coupling member, and the tether cutters to cut the tether are used as the coupling member disabling unit. However, specific configurations of the coupling member and the coupling member disabling unit are not to be limited to these but may be changed as suited.

The airbag apparatus according to the embodiment of the disclosure includes the airbag, the collision determiner, and the airbag deployment controller. The airbag is configured to be deployed forward of the vehicle body front of the vehicle. The collision determiner is configured to establish a pre-crash determination when a collision probability with a human body or an object other than a human body is equal to or higher than the predetermined threshold. The airbag deployment controller is configured to deploy the airbag in response to the pre-crash determination. The airbag includes the slit portion formed by recessing the front surface rearward of the vehicle, and the plurality of branches divided by the slit portion. The airbag apparatus further includes the coupling member and the coupling member disabling unit. The coupling member is configured to couple the plurality of branches to each other. The coupling member disabling unit is configured to break coupling of the branches by the coupling member when a collision with the human body is predicted.

With this configuration, during a collision with a human body of a pedestrian or the like, the coupling member is disabled to allow the slit portion to separate the branches of the front portion of the airbag from each other. Consequently, the pedestrian or the like collided with enters the slit portion and is held between the branches on both sides of the slit portion so that impact can be absorbed by the airbag while the pedestrian or the like is stably restrained, and that the pedestrian or the like can be pressed and accelerated forward of the vehicle so as to decrease relative acceleration of the pedestrian or the like and the vehicle body, thereby preventing injury.

Since the pedestrian or the like is retained while held in the slit portion, risk of secondary injury such as the pedestrian or the like being sent flying forward of the vehicle can be reduced.

During a collision with an object such as another vehicle, the branches of the front portion of the airbag are mutually coupled by the coupling member so that shape stability of the airbag can be enhanced to stably receive collision energy input by the object such as the other vehicle.

In the embodiment of the disclosure, the coupling member may be the tether made of a flexible material and attached to the outer surface of the airbag, and the coupling member disabling unit may be the tether cutter configured to cut the tether.

Thus, the above-described effects can be effectively obtained with a simple configuration.

In the embodiment of the disclosure, the slit portion may extend vertically and may include the plurality of the slit portions formed in the front surface of the airbag and distributed in the vehicle width direction.

With this configuration, the human body that collides with the airbag in a wide range in the vehicle width direction can be restrained.

It is noted that in the specification and claims, an expression of the slit portion extending vertically refers to vertically opposite ends of the slit portion having a level difference, and is not limited to the slit portion being formed exactly along a vertical direction but defined to include a state of being inclined, curved, and bent with respect to the vertical direction.

As described above, according to the embodiment of the disclosure, it is possible to provide the airbag apparatus that can reduce injury to a pedestrian or the like and that can prevent damage to a vehicle during a collision with an object.

The airbag control unit 110 and the environment recognition unit 120 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110 and the environment recognition unit 120 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110 and the environment recognition unit 120 illustrated in FIG. 2.

The invention claimed is:

1. An airbag apparatus to be applied to a vehicle, the airbag apparatus comprising:
    an airbag configured to be deployed forward of a vehicle body front of the vehicle;
    a collision determiner configured to establish a pre-crash determination in a case a collision probability with a human body or an object other than a human body is equal to or higher than a predetermined threshold; and
    an airbag deployment controller configured to deploy the airbag in response to the pre-crash determination,
    wherein the airbag comprises
        a slit portion formed by recessing a front surface rearward of the vehicle, and
        branches divided by the slit portion,
    the airbag apparatus further comprising:
    a coupling member configured to couple the branches to each other; and
    a coupling member disabling unit configured to break coupling of the branches by the coupling member in a case where a collision with the human body is predicted.

2. The airbag apparatus according to claim 1,
    wherein the coupling member comprises a tether made of a flexible material, the tether being attached to an outer surface of the airbag, and
    wherein the coupling member disabling unit comprises a tether cutter configured to cut the tether.

3. The airbag apparatus according to claim 1, wherein the slit portion extends vertically and comprises slit portions formed in the front surface of the airbag, the slit portions being distributed in a vehicle width direction.

4. The airbag apparatus according to claim 2, wherein the slit portion extends vertically and comprises slit portions formed in the front surface of the airbag, the slit portions being distributed in a vehicle width direction.

5. An airbag apparatus to be applied to a vehicle, the airbag apparatus comprising:
    an airbag configured to be deployed forward of a vehicle body front of the vehicle; and
    circuitry configured to
        establish a pre-crash determination in a case a collision probability with a human body or an object other than a human body is equal to or higher than a predetermined threshold, and
        deploy the airbag in response to the pre-crash determination,
    wherein the airbag comprises
        a slit portion formed by recessing a front surface rearward of the vehicle, and
        branches divided by the slit portion,
    the airbag apparatus further comprising:
    a coupling member configured to couple the branches to each other; and
    a coupling member disabling unit configured to break coupling of the branches by the coupling member in a case where a collision with the human body is predicted.

* * * * *